(12) United States Patent
Boehme

(10) Patent No.: US 7,126,085 B1
(45) Date of Patent: Oct. 24, 2006

(54) SELF-DARKENING SHIELD FOR REPLACEABLY ATTACHING TO A TORCH

(76) Inventor: Hilary Boehme, 375 Marcus Blvd., Hauppauge, NY (US) 11788

( * ) Notice: Subject to any disclaimer, the term of this patent is extended or adjusted under 35 U.S.C. 154(b) by 0 days.

(21) Appl. No.: 11/195,841

(22) Filed: Aug. 3, 2005

(51) Int. Cl.
*B23K 9/32* (2006.01)

(52) U.S. Cl. .................................................... 219/147

(58) Field of Classification Search ............... 219/147; 228/59; 359/361
See application file for complete search history.

(56) References Cited

U.S. PATENT DOCUMENTS

| | | | |
|---|---|---|---|
| 1,217,838 A | 2/1917 | Schmidt | |
| 2,410,306 A * | 10/1946 | Romberg | 219/147 |
| 4,155,122 A | 5/1979 | Budmiger | |
| 4,494,873 A * | 1/1985 | Perlmutter et al. | 356/467 |
| 5,241,154 A | 8/1993 | Estrate | |
| 5,802,622 A * | 9/1998 | Baharad et al. | 2/434 |
| 5,854,461 A | 12/1998 | Sorenson | |
| 6,070,264 A | 6/2000 | Hamilton et al. | |
| 6,161,590 A | 12/2000 | Wulff | |
| 6,172,334 B1 | 1/2001 | Harris et al. | |

\* cited by examiner

*Primary Examiner*—Kevin P. Kerns

(57) ABSTRACT

A self-darkening shield for replaceably attaching to a torch. The self-darkening shield includes a shield and apparatus. The shield replaceably attaches to the torch, is self-darkening, and is a plate that is substantially inverted U-shaped to straddle the torch to provide shielding not only above the torch but also to its sides. The apparatus is operatively connected to the shield and replaceably attaches the shield to the torch.

13 Claims, 3 Drawing Sheets

SELF-DARKENING SHIELD FOR REPLACEABLY ATTACHING TO A TORCH

BACKGROUND OF THE INVENTION

A. Field of the Invention

The present invention relates to a shield, and more particularly, the present invention relates to a self-darkening shield for replaceably attaching to a torch.

B. Description of the Prior Art

Numerous innovations for torch shields have been provided in the prior art that will be described. Even though these innovations may be suitable for the specific individual purposes to which they address, however, they differ from the present invention in that they do not teach a transmission cross member for accommodating a dual exhaust system and replacing an existing transmission cross member accommodating a single exhaust system.

(1) U.S. Pat. No. 1,217,838 to Schmidt.

For example, U.S. Pat. No. 1,217,838 issued to Schmidt on Feb. 27, 1917 teaches eye shields for protecting the eyes and face from flying pieces of metal, emery, and the like from lathes, grinding wheels, and the like.

(2) U.S. Pat. No. 2,235,594 to Smith.

Another example, U.S. Pat. No. 2,235,594 issued to Smith on Dec. 19, 1939 teaches a shield primarily adapted for use on wielding torches such as are used in oxygen-acetylene welding or the equivalent, and it aims generally to provide such a shield as will protect the face and eyes from flying sparks, bright lights, glare, heat and the like.

(3) U.S. Pat. No. 4,155,122 to Budmiger.

Still another example, U.S. Pat. No. 4,155,122 issued to Budmiger teaches a welder's helmet having a window with an upper section of invariable light-attenuation characteristics and a dimmable lower section including an ultraviolet filter, an infrared filter, and an electro-optical shutter, such as a liquid crystal sandwiched between a polarizer and an analyzer. A control circuit including a UV-sensitive photocell—upon sensing a welding arc or flame—operates the shutter to reduce the amount of light transmitted through the lower section of the window.

(4) U.S. Pat. No. 5,241,154 to Estrate.

Yet another example, U.S. Pat. No. 5,241,154 issued to Estrate on Aug. 31, 1993 teaches a shield for a welding torch. The shield can be adjusted to positions above, beneath, and to either side of the tip of the torch.

(5) U.S. Pat. No. 5,854,461 to Sorenson.

Still yet another example, U.S. Pat. No. 5,854,461 issued to Sorenson on Dec. 29, 1998 teaches a shield for the protection of a welder's gloved hand and/or a welding instrument during a welding operation and has dual plates defining an air channel allowing a cooling flow of air through the air channel and past the plate that is in closest proximity to the welding operation.

(6) U.S. Pat. No. 6,070,264 issued to Hamilton et al.

Yet still another example, U.S. Pat. No. 6,070,264 issued to Hamilton et al. Teaches a welding helmet including a shutter assembly with an electronically controlled liquid crystal shutter in a compact housing for physical mounting near the face area of a protective shell. The electronic controls provide for the customary auto-darkening function as well as two user selectable fixed shade settings that permit the user to fix the shutter shade in one of a plurality of preselected and factory set shade settings. When fixed at a shade setting, the user is given a visual indication that the helmet is not in an auto-darkening mode. The housing allows for two PC boards to be mounted above and below the optical shutter, with a flexible cable interconnecting the two PC boards so as to not interfere with or obscure the user's vision. The controls are all single function, readily accessible, and continuous so that multiple operation of any one control does not switch the associated function off allowing a user to continuously operate any control repeatedly to ensure its selection. As the electronics and shutter are self-contained in a single housing, ready assembly and field change out are accommodated.

(7) U.S. Pat. No. 6,161,590 issued to Wulff.

Still yet another example, U.S. Pat. No. 6,161,590 issued to Wulff on Dec. 19, 2000 teaches a portable wind guard for use on a pipe to shield a weld being applied from wind. The wind guard includes a collar, a Velcro™ belt for attaching and securing the collar to the pipe, and a shield extending generally perpendicularly from the collar. The shield can be collapsible, hence readily transportable from site to site.

(8) U.S. Pat. No. 6,172,334 issued to Harris et al.

Yet still another example, U.S. Pat. No. 6,172,334 issued to Harris et al. on Jan. 9, 2001 teaches a welding device to enable a welder to maintain an upright position when welding at floor level. The device is a rigid handle having a pistol-type handgrip and telescoping tubes. The telescoping tubes can be easily adjusted and interlocked, thus providing a handle that is adjustable to a plurality of lengths. The handgrip is angled approximately 90° to the longitudinal axis of the handle, and provides for a comfortable and secure grip. The electrode holder used in the welding process can be releasably attached to the distal end of the device. In a preferred embodiment, the telescoping tubes and handgrip are hollow, so that a power cable can be fed through the device and connected to the electrode holder. Mounted on the device is a welding shield made of welder's glass, which shields the welder's eyes from the welding flame and protects the welder from sparks arising from the welding site, thus eliminating the need on the part of the welder to wear a welding hood with mask. The device provides for increased safety and comfort of the welder.

It is apparent that numerous innovations for torch shields have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

Accordingly, an object of the present invention is to provide a self-darkening shield for replaceably attaching to a torch that avoids the disadvantages of the prior art.

Briefly stated, another object of the present invention is to provide a self-darkening shield for replaceably attaching to a torch. The self-darkening shield includes a shield and apparatus. The shield replaceably attaches to the torch, is self-darkening, and is a plate that is substantially inverted U-shaped to straddle the torch to provide shielding not only above the torch but also to its sides. The apparatus is operatively connected to the shield and replaceably attaches the shield to the torch.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
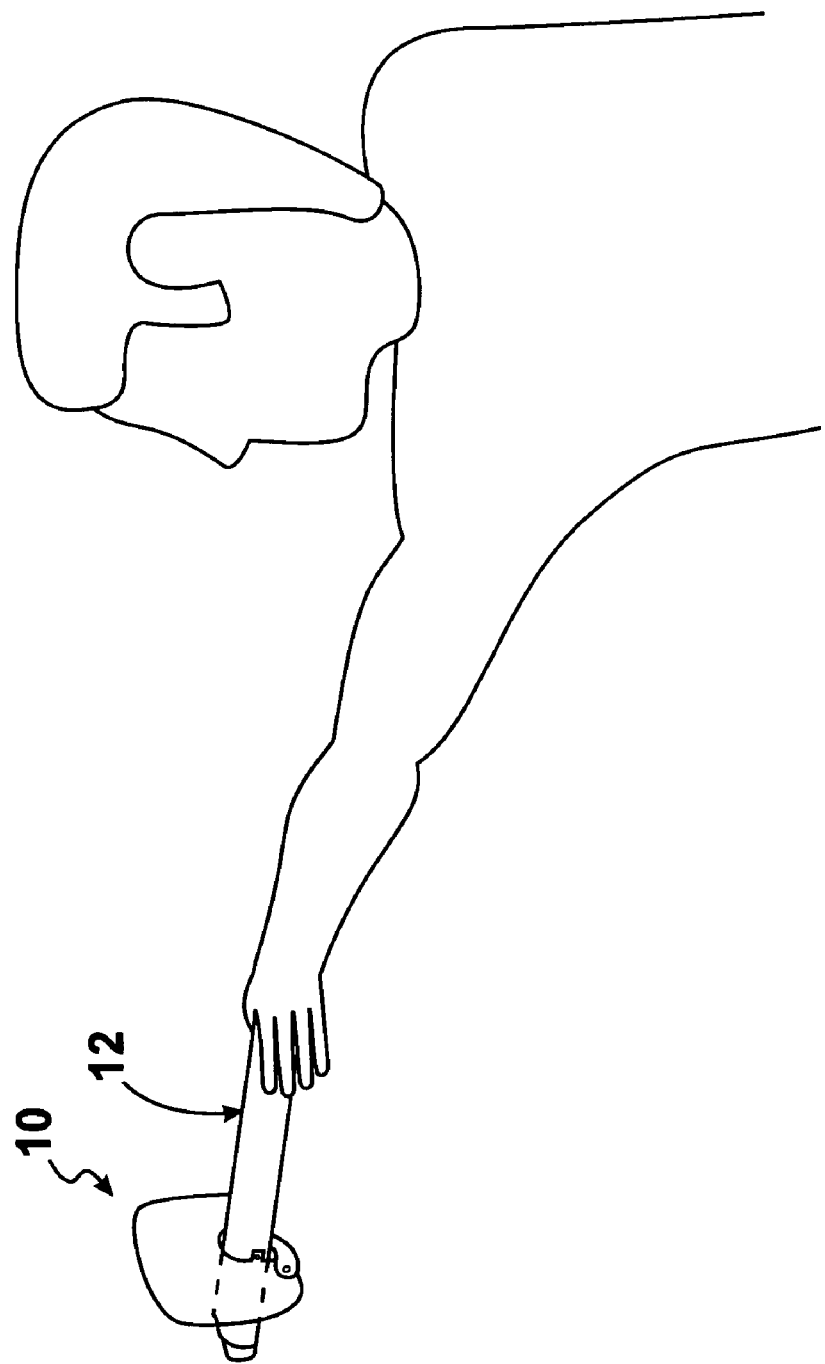
FIG. 1 is a diagrammatic perspective view of the self-darkening shield of the present invention replaceably attached to a torch in use.

LIST OF REFERENCE NUMERALS UTILIZED IN THE DRAWING 10 self-darkening shield of present invention for replaceably attaching to torch 12
12 torch
14 top of torch 12
16 sides of torch 12
18 bottom of torch 12
20 main shield for replaceably attaching to torch 12
22 apparatus for replaceably attaching main shield 20 to torch 12
24 plate of main shield 20 for straddling torch 12 so as to provide shielding not only at top 14 of torch 12 but also at sides 16 of torch 12
26 open bottom of plate 24 of main shield 20
27 open center of plate 24 of main shield 20
28 auxiliary shield
29 torch-facing edge of open center 27 of plate 24 of main shield 20
30 plate of auxiliary shield 28 for providing shielding at bottom 18 of torch 12
31 torch-facing edge of plate 30 of auxiliary shield 28 for providing shielding at bottom 18 of torch 12
32 first resilient insert of apparatus 22 for providing sealing fit for main shield 20 against torch 12
34 second resilient insert of apparatus 22 for providing sealing fit for auxiliary shield 28 against torch 12
36 at least two tabs of apparatus 22 for extending along sides 16 of torch 12
38 throughbores through at least two tabs 36 of apparatus 22
40 thumbscrews of apparatus 22 for tightening against torch 12 for maintaining self-darkening shield 10 on torch 12

DETAILED DESCRIPTION OF THE PREFERRED EMBODIMENT

Referring now to the figures, in which like numerals indicate like parts, and particularly to FIG. 1, which is a diagrammatic perspective view of the self-darkening shield of the present invention attached to a torch in use, the self-darkening shield of the present invention is shown generally at 10 for replaceably attaching to a torch 12. The torch 12 has a top 14, sides 16, and a bottom 18.

Figure 2:
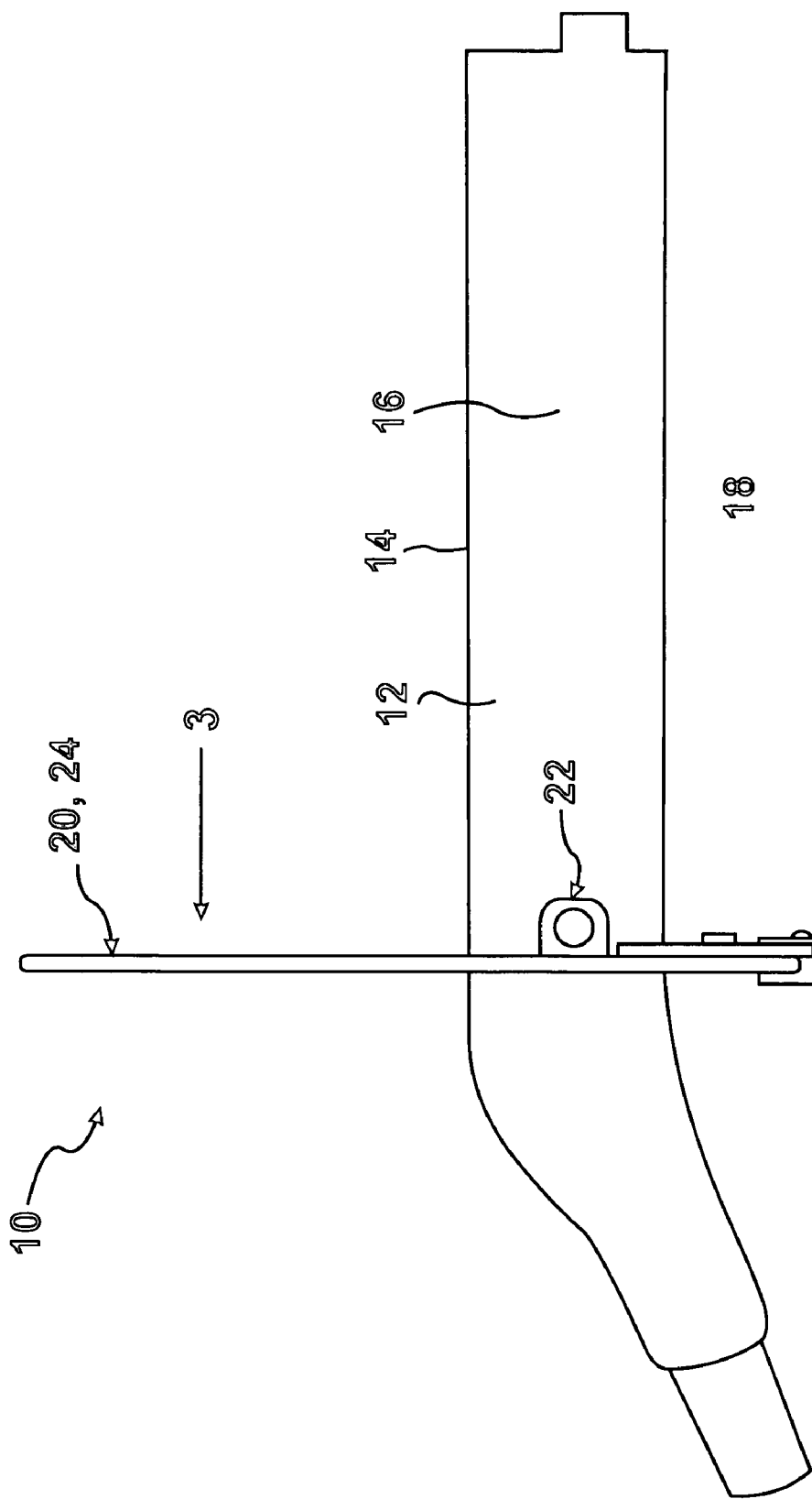
FIG. 2 is an enlarged diagrammatic side elevational view of the area generally enclosed by the dotted curve identified by ARROW 2 in FIG. 1 of the self-darkening shield of the present invention replaceably attached to the torch.
Figure 3:
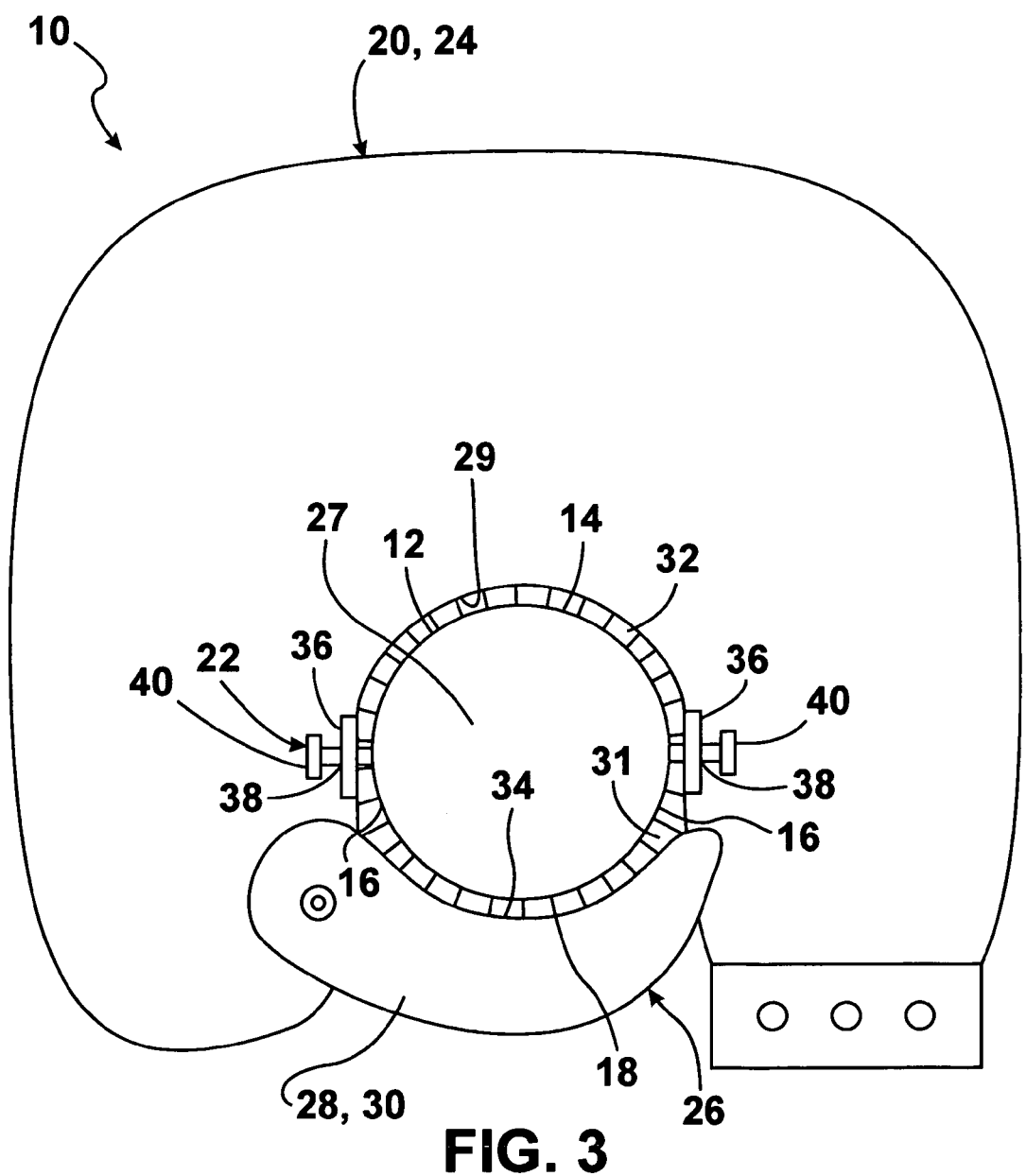
FIG. 3 is a front elevational view taken generally in the direction of ARROW 3 in FIG. 2 of the of the self-darkening shield of the present invention.

The configuration of the self-darkening shield 10 can best be seen in FIGS. 2 and 3, which are, respectively, an enlarged diagrammatic side elevational view of the area generally enclosed by the dotted curve identified by ARROW 2 in FIG. 1 of the self-darkening shield of the present invention replaceably attached to the torch, and, a front elevational view taken generally in the direction of ARROW 3 in FIG. 2 of the self-darkening shield of the present invention, and as such, will be discussed with reference thereto.

The self-darkening shield 10 comprises a main shield 20 and apparatus 22. The main shield 20 is self-darkening and is for replaceably attaching to the torch 12. The apparatus 22 is operatively connected to the main shield 20 and is for replaceably attaching the main shield 20 to the torch 12. The way of self-darkening the main shield 20 can be found, e.g., in U.S. Pat. No. 4,155,122 to Budmiger, and as such, Budmiger is incorporated herein by reference thereto. The main shield 20 is a plate 24 that is substantially inverted U-shaped so as to have an open bottom 26 and an open center 27 with a torch-facing edge 29, and is for straddling the torch 12 so as to provide shielding not only at the top 14 of the torch 12 but also at the sides 16 of the torch 12.

The self-darkening shield 10 further comprises an auxiliary shield 28. The auxiliary shield 28 is a plate 30 that is opaque, pivotally attached to the main shield 20 at the open bottom 26 of the main shield 20, is substantially crescent-shaped to selectively close the open bottom 26 of the main shield 20 to provide shielding at the bottom 18 of the torch 12, and has a torch-facing edge 31.

The apparatus 22 comprises a first resilient insert 32. The first resilient insert 32 is substantially semi-circular and lines the torch-facing edge 29 of the open center 27 of the plate 24 of the main shield 20 for providing a sealing fit for the main shield 20 against the torch 12.

The apparatus 22 further comprises a second resilient insert 34. The second resilient insert 34 is substantially semi-circular and lines the torch-facing edge 31 of the plate 30 of the auxiliary shield 28 for providing a sealing fit for the auxiliary shield 28 against the torch 12.

The apparatus 22 further comprises at least two tabs 36. The at least two tabs 36 extend generally opposing from the open center 27 of the plate 24 of the main shield 20, terminate in throughbores 38, respectively, and are for extending along the sides 16 of the torch 12.

The apparatus 22 further comprises at least two thumbscrews 40. The at least two thumbscrews 40 threadably engage through the throughbores 38 in the at least two tabs 36, respectively, and are for tightening against the torch 12 for maintaining the self-darkening shield 10 on the torch 12.

It will be understood that each of the elements described above, or two or more together, may also find a useful application in other types of constructions differing from the types described above.

While the invention has been illustrated and described as embodied in a self-darkening shield for replaceably attaching to the torch, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A self-darkening shield for replaceably attaching to a torch, wherein the torch has a top, sides, and a bottom, said self-darkening shield comprising:
   a) a main shield;
   b) an apparatus; and
   c) an auxiliary shield;
   wherein said main shield is self-darkening;
   wherein said main shield is for replaceably attaching to the torch;
   wherein said apparatus is operatively connected to said main shield;
   wherein said apparatus is for replaceably attaching said main shield to the torch wherein said main shield is substantially inverted U-shaped to straddle the torch so as to provide shielding not only at the top of the torch but also at the sides of the torch;
   wherein said auxiliary shield is pivotally attached to said main shield for providing shielding at the bottom of the torch; and
   wherein said auxiliary shield is substantially crescent-shaped.

2. The self-darkening shield of claim 1, wherein said main shield is a plate.

3. The self-darkening shield of claim 1, wherein said auxiliary shield is a plate.

4. The self-darkening shield of claim 1, wherein said main shield has an open bottom; and
   wherein said auxiliary shield is pivotally attached to said main shield at said open bottom of said main shield to selectively close said open bottom of said main shield.

5. The self-darkening shield of claim 1, wherein said auxiliary shield is opaque.

6. The self-darkening shield of claim 1, wherein said apparatus comprises a first resilient insert;
   wherein said main shield has an open center;
   wherein said open center of said main shield has a torch-facing edge; and
   wherein said first resilient insert lines said torch-facing edge of said open center of said main shield for providing a sealing fit for said main shield against the torch.

7. The self-darkening shield of claim 6, wherein said first resilient insert is substantially semi-circular.

8. The self-darkening shield of claim 1, wherein said apparatus further comprises a second resilient insert;
   wherein said auxiliary shield has a torch-facing edge; and
   wherein said second resilient insert lines said torch-facing edge of said auxiliary shield for providing a sealing fit for said auxiliary shield against the torch.

9. The self-darkening shield of claim 8, wherein said second resilient insert is substantially semi-circular.

10. The self-darkening shield of claim 1, wherein said apparatus further comprises at least two tabs;
    wherein said main shield has an open center;
    wherein said at least two tabs extend from said open center of said main shield; and
    wherein said at least two tabs are for extending along the sides of the torch.

11. The self-darkening shield of claim 10, wherein said at least two tabs extend generally opposing from said open center of said main shield.

12. The self-darkening shield of claim 10, wherein said at least two tabs terminate in throughbores, respectively.

13. The self-darkening shield of claim 12, wherein said apparatus further comprises at least two thumbscrews;
    wherein said at least two thumbscrews threadably engage through said throughbores in said at least two tabs, respectively; and
    wherein said at least two thumbscrews are for tightening against the torch for maintaining said self-darkening shield on the torch.

\* \* \* \* \*